United States Patent [19]

Nalbach

[11] Patent Number: 4,561,534

[45] Date of Patent: Dec. 31, 1985

[54] CONTAINER ORIENTING APPARATUS

[75] Inventor: John C. Nalbach, Western Springs, Ill.

[73] Assignee: John R. Nalbach Engineering Co., Inc., Chicago, Ill.

[21] Appl. No.: 658,354

[22] Filed: Oct. 5, 1984

[51] Int. Cl.[4] .............................................. B65G 47/24
[52] U.S. Cl. .................... 198/400; 198/411; 198/689.1; 198/395
[58] Field of Search ............... 198/410, 411, 412, 394, 198/395, 400, 689

[56] References Cited

U.S. PATENT DOCUMENTS

| 3,012,650 | 12/1961 | Carter | 198/394 |
|---|---|---|---|
| 3,439,729 | 4/1969 | Frank et al. | 198/415 |
| 3,592,334 | 7/1971 | Fleischaver | 198/689 X |
| 3,827,211 | 8/1974 | Zavatone et al. | 198/411 X |
| 3,934,716 | 1/1976 | Heckel | 198/400 X |
| 3,958,688 | 5/1976 | Sterling | 198/395 X |
| 4,149,621 | 4/1979 | Sollenberger et al. | 198/395 |

FOREIGN PATENT DOCUMENTS

55-145922  11/1980  Japan .................................. 198/395

Primary Examiner—Joseph E. Valenza
Assistant Examiner—Michael Stone
Attorney, Agent, or Firm—Anthony S. Zummer

[57] ABSTRACT

The present invention relates to an improved apparatus for orienting substantially identical containers. Each container has a base for supporting the container. Each container is asymmetrical in a plane substantially perpendicular to the respective base. The apparatus includes a longitudinal conveyor for moving the containers from one end of a frame to the other. A first turning assembly is mounted on the frame to turn the containers relative to the longitudinal conveyor to arrange the containers in an attitude wherein the asymmetrical plane of each container is parallel to the direction of movement. An attitude detector apparatus is positioned adjacent to the discharge end of the first turning assembly and detects the attitude of containers discharged. A second turning assembly rotates the containers discharged from the first turning assembly 90° either clockwise or counterclockwise in response to a signal from the attitude detector to align all of the containers in the same attitude.

23 Claims, 8 Drawing Figures

CONTAINER ORIENTING APPARATUS

BACKGROUND OF THE INVENTION

The packaging of goods has developed to a point where certain goods are no longer packaged in symmetrical containers, rather some goods are packaged in containers wherein a filling and discharge aperture or spout is offset from the center of the container. These containers often are made of a lightweight plastic material to reduce the handling costs and to provide an inexpensive container. In the manufacture of containers of this general type, the containers are randomly discharged into a large holding container. In order to utilize modern packaging and labeling equipment, it is necessary to arrange the containers so that the containers are not only aligned in the same direction, but also that each container has the same relative position as each other container, that is, if a spout is offset, all of the spouts are arranged in the same direction. An apparatus for aligning containers vertically is taught in U.S. Pat. No. 3,650,368, issued Mar. 21, 1972, entitled, "Article-Orienting Apparatus", to John C. Nalbach. The mentioned patented article orienting apparatus does not position the containers so that each container is aligned with each asymmetrical portion in the same relative position. It is therefore necessary to position selectively the containers. The heretofore known apparatus rotates selected containers 180° in one movement to align all of the containers. Inasmuch as the containers are lightweight, and the containers are rotated 180° in a single movement, there is a tendency for the containers to tip and fall. When containers fall, the container may knock over a number of other containers through a domino effect and thereby disrupt the smooth operation of a packaging facility.

SUMMARY OF THE PRESENT INVENTION

The present invention relates to an apparatus for orienting substantially identical containers. Each of the containers has a base for holding the container upright. Each container is asymmetrical in a plane substantially perpendicular to the base. The containers are delivered to the apparatus in a single line, but the position of the asymmetrical plane is random. The containers are carried by a longitudinal conveyor to a first turning assembly. The first turning assembly aligns all of the containers so that the asymmetrical plane of each container is parallel to the direction of movement of the longitudinal conveyor. When the containers are discharged from the first turning assembly, a detector senses the position of the asymmetrical plane of each of the containers. A second turning assembly which is in part controlled by the detector, rotates each container approximately 90° either in a clockwise or counterclockwise direction to align all of the containers leaving the second turning assembly in a line with the asymmetrical planes being in the same relative position.

DESCRIPTION OF THE PREFERRED EMBODIMENT

Figure 1:
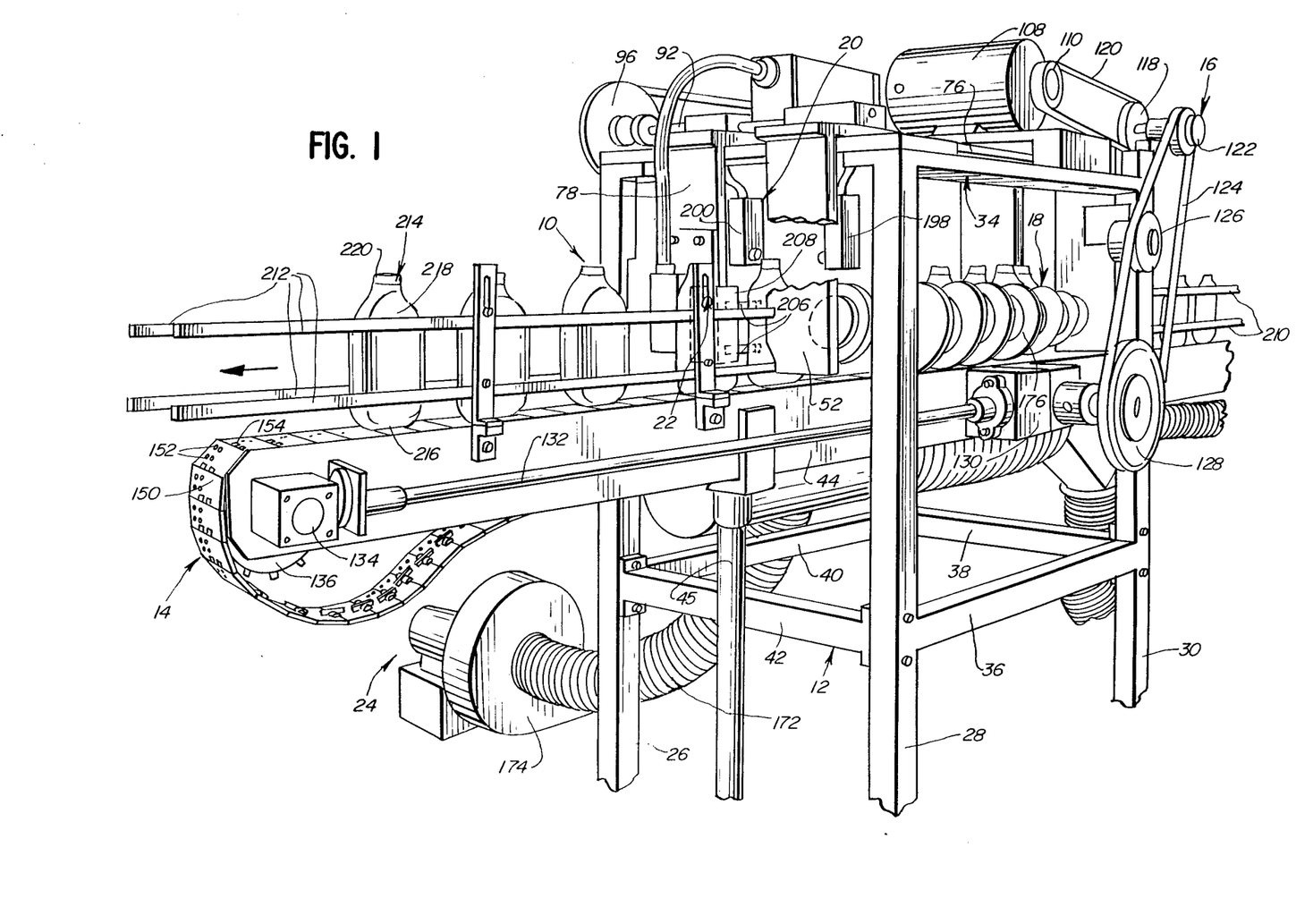
FIG. 1 is a perspective view of a container orienting apparatus embodying the herein disclosed invention.

Referring now to the drawings and especially to FIG. 1, a container orienting apparatus embodying the herein disclosed invention is shown therein and is generally indicated by numeral 10. Apparatus 10 generally includes; a frame 12, a longitudinal conveyor 14 mounted on the frame, a drive 16 mounted on the frame and connected to the longitudinal conveyor, a first turning assembly 18 mounted on the frame and connected to drive 16, a detector assembly 20 mounted on the frame above a portion of the longitudinal conveyor, a second turning assembly 22 positioned adjacent to the first turning assembly and having a portion controlled by the detector assembly, and an exhaust assembly 24 having a portion cooperative with the longitudinal conveyor to create a negative pressure over a selected portion of the conveyor.

Frame 12 is conventional in its construction in that it includes four uprights 26, 28, 30 and 32, and an upper portion 34 supported by the uprights. The upper portion supports drive 16. Four brackets 36, 38, 40 and 42 interconnect the uprights between the upper portion 34 and the bottom of the uprights. The frame includes a conveyor box 44 which is fixed to uprights 26 and 32, and is supported by leg 45.

Figure 2:
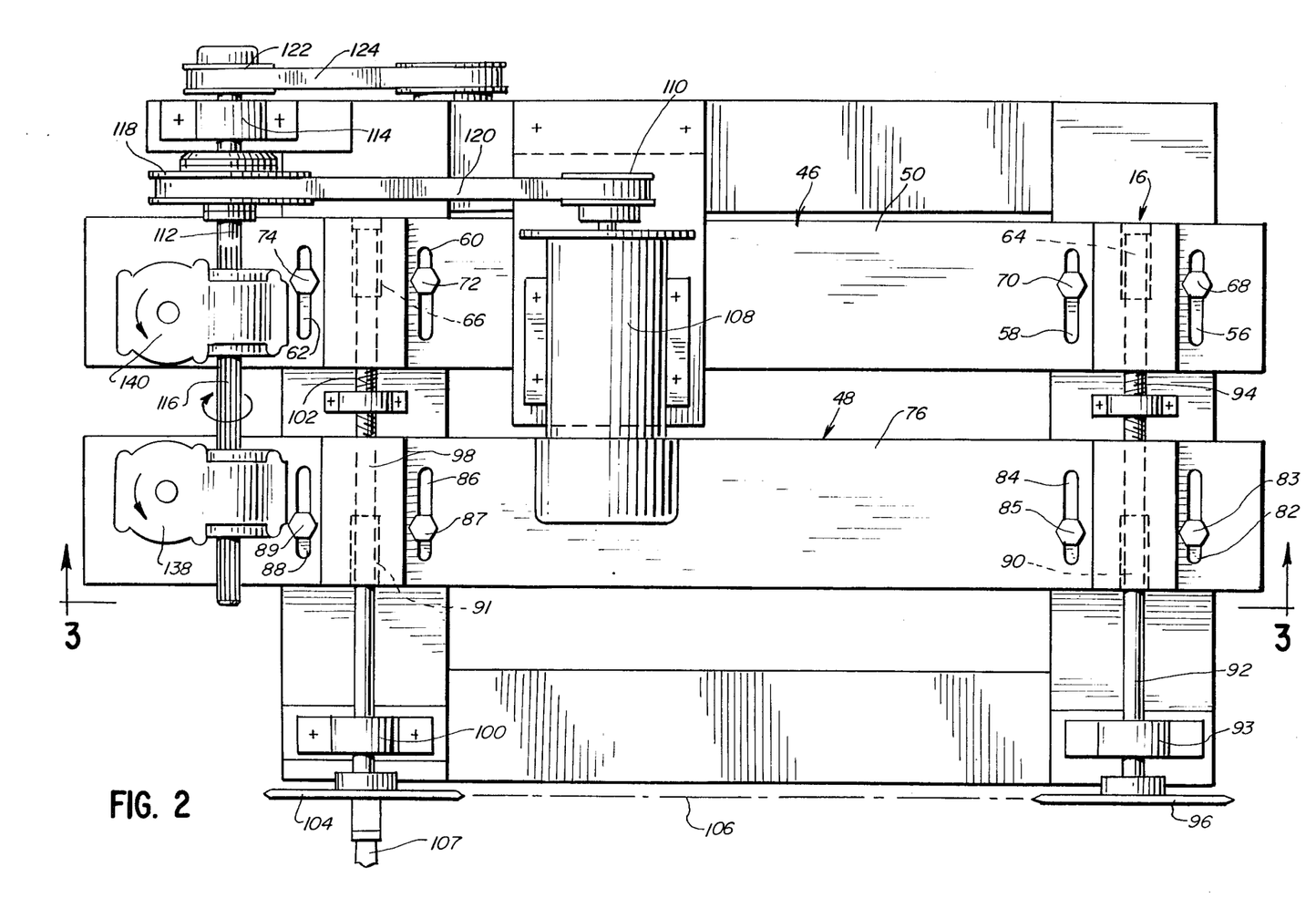
FIG. 2 is a plan view of an upper portion of the apparatus of FIG. 1 showing the interrelationship of the various drive portions.
Figure 3:
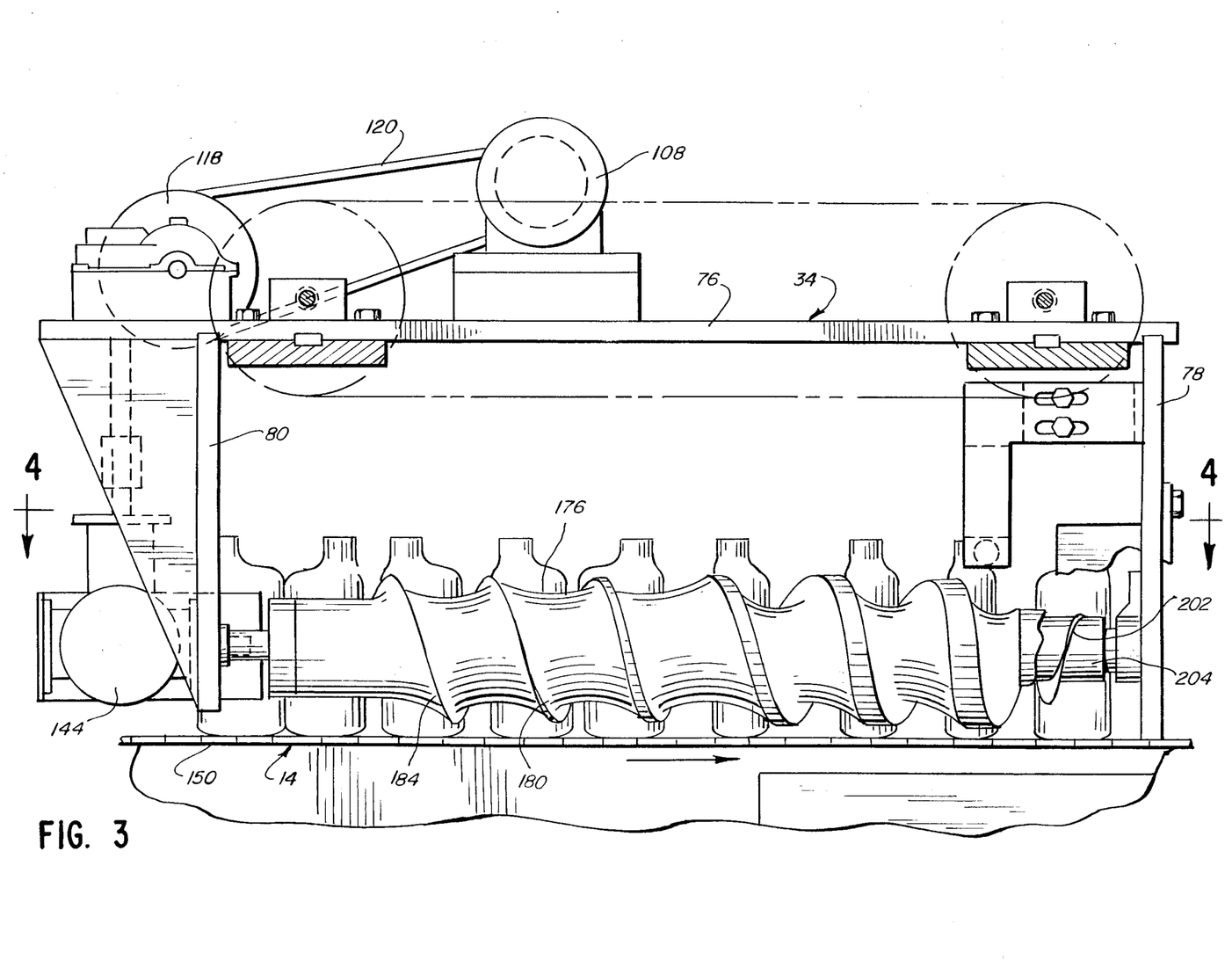
FIG. 3 is a cross-sectional view taken on Line 3—3 showing a portion of the drive shown in FIG. 2 and showing a fragmentary portion of a screw conveyor of the present apparatus.

Looking now to FIGS. 1 and 2, a portion of drive 16 is shown therein. Drive 16 includes a pair of drive supports 46 and 48 mounted on the frame. Drive support 46 includes a table 50 which has a discharge end 52 fixed thereon. Discharge end 52 extends downwardly to approximately the level of the longitudinal conveyor. Table 50 has an entry support 54 at the other end thereof. The entry support is positioned on the same level as the longitudinal conveyor, as may be best seen in FIG. 6. Table 50 includes a pair of slots 56 and 58 adjacent to the discharge end. Table 50 also includes a pair of slots 60 and 62 adjacent to the inlet end. A nut 64 is fixed to the lower surface of table 50 between slots 56 and 54. A like nut 66 is fixed to the bottom of table 50 between slots 60 and 62. Bolts 68 and 70 are threadedly mounted in the upper portion 34 and are slideably positioned in slots 56 and 58, respectively. Bolts 72 and 74 are threadedly mounted in upper portion 34 and are slideably mounted in slots 60 and 62. The bolts 68, 70, 72 and 74 are used to lock the table to the upper portion.

Drive support 48 includes a table 76 which has a discharge end support 78 fixed to one end of table 76. An entry end support 80 is fixed to the other end of table 76. Table 76 includes a pair of slots 82 and 84 which are substantially identical to slots 56 and 58. Bolts 83 and 85 are threadedly mounted in the upper portion and are slideably mounted in slots 82 and 84, respectively. Table 76 includes a pair of slots 86 and 88 adjacent to the entry end of table 76 and those slots are substantially identical to slots 60 and 62. Bolts 87 and 89 are threadedly mounted in the upper portion and are slideably mounted in slots 86 and 88, respectively. Tightening of bolts 83, 85, 87, and 89 locks table 76 to the upper portion. A nut 90 is fixed to the bottom of table 72 between slots 82 and 84. A like nut 91 is fixed to the bottom of table 76 between slots 86 and 88. A shaft 92 is rotatably mounted in a bearing 93 which is supported on the upper portion. Shaft 92 is connected to a threaded portion 94 having right-hand and left-hand threads and is threadedly mounted in nuts 64 and 90. A sprocket 96 is fixed to one end of shaft 92. A like shaft 98 is mounted in a bearing 100. Shaft 98 has a threaded portion 102. Threaded portion 102 has right-hand and left-hand threads which are connected to nuts 66 and 91. Shaft 98 has a sprocket 104 fixed to one end thereof. Sprocket 104 is connected to sprocket 96 by a conventional chain 106. Sprocket 104 includes a crank 107 to crank the sprocket. As sprocket 104 is turned, it drives sprocket 96 for selectively moving tables closer together or further apart as may be desired through the interaction of the threaded platens of shafts 92 and 98 with the nuts fixed to the bottom of tables 50 and 76.

An electrical motor 108 is mounted on the upper portion. Motor 108 has a sheave 110 mounted on its output shaft. The motor is mounted on upper portion 34 so as not to interfere with movement of tables 50 and 76. A drive shaft 112 has a portion mounted in a bearing 114. The drive shaft has a splined portion 116. A pulley 118 is secured to drive shaft 112. A belt 120 drivingly connects sheave 110 with pulley 118. A drive sheave 122 is fixed to the end of drive shaft 116. A belt 124 is connected to sheave 122. The belt engages an idler pulley 126 mounted on the frame and a conveyor drive pulley 128. The conveyor drive pulley is connected to a gear box 130 which has a conveyor drive shaft 132 connected thereto. The conveyor drive shaft 132 is connected to a conveyor gear box 134 which is connected to a conveyor sprocket 136 to drive longitudinal conveyor 14.

Drive shaft 116 is connected to a pair of vertical gear boxes 138 and 140. Gear box 138 is connected to a vertical drive shaft 142, which in turn is drivingly connected to a screw drive 144. Gear box 140 is connected to a vertical drive shaft 146 which is connected to screw drive 148. Screw drives 144 and 148 are mounted on end supports 80 and 54, respectively, as may be best seen in FIG. 6.

Figures 6, 7, 8:
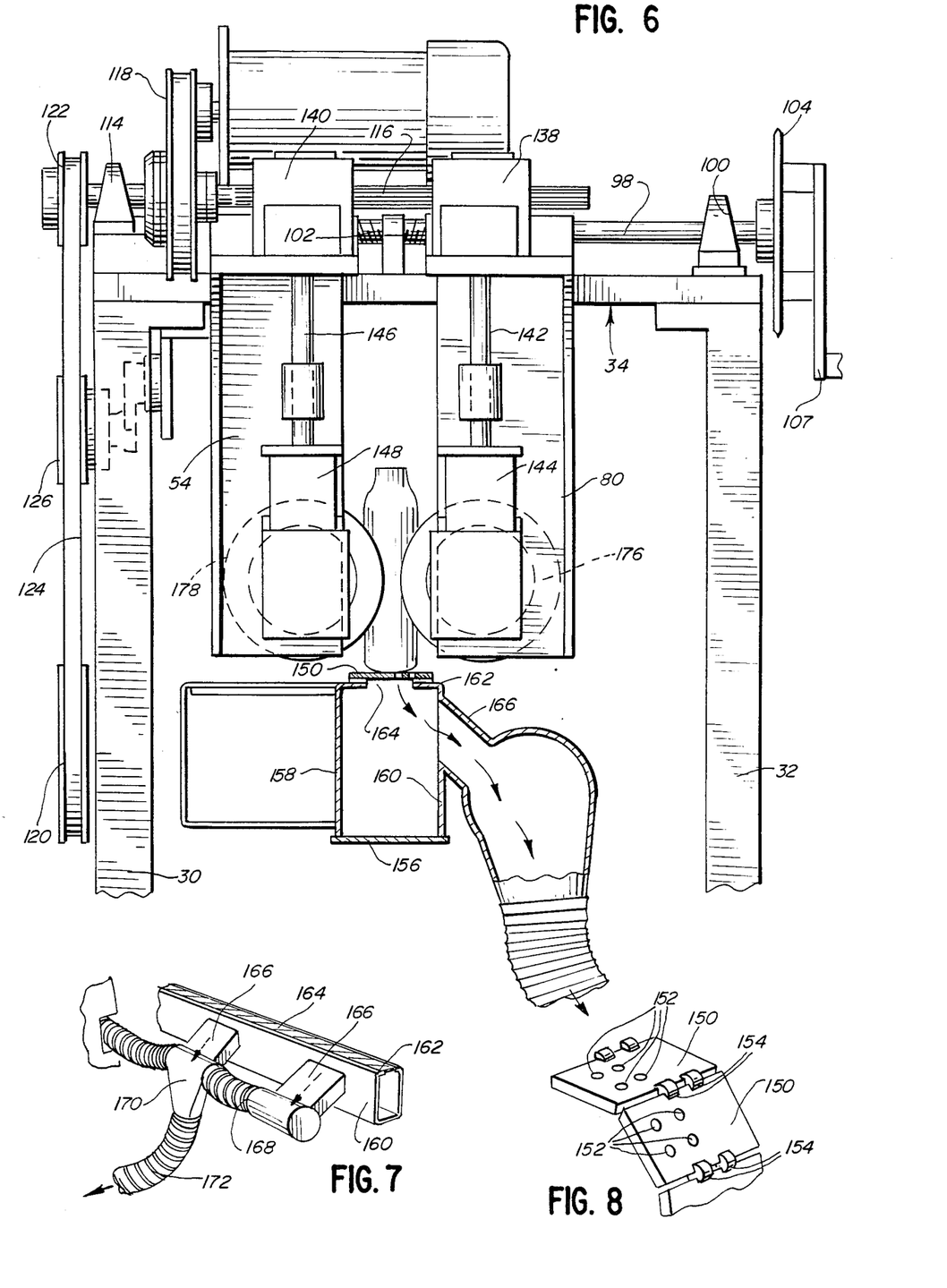
FIG. 6 is an end elevational view of an entry portion to a pair of screw conveyors and showing a portion of a drive.
FIG. 7 is a fragmentary perspective view showing a portion of an exhaust assembly to create a negative pressure over a portion of a longitudinal conveyor.
FIG. 8 is a fragmentary perspective view showing platens which make up a portion of a longitudinal conveyor showing the apertures in the platens.

Conveyor 14, as may be best seen in FIGS. 1 and 8, is made up of a plurality of identical individual platens 150. Each of the platens contains four apertures 152 which allow air to pass through each of the platens. Each platen is connected to adjacent platens by hinges 154. The platens are driven by sprocket 136 to move the conveyor longitudinally over conveyor box 44. Conveyor box 44 has a closed bottom 156 and a pair of sides 158 and 160. The box has a top 162 with an opening 164 formed in the top.

Exhaust assembly 24 is connected to the conveyor box. The exhaust assembly includes a pair of conduits 166 which open into wall 160. The conduits 166 are interconnected by tube 168 to a connector 170 which is in turn connected to a flue 172. The flue 172 is connected to a conventional centrifugal exhaust fan 174. Thus, air is pulled through the apertures 152 into conveyor box 44 and to the exhaust fan creating a negative pressure over the outside upper surface of the longitudinal conveyor.

Figures 4, 5:
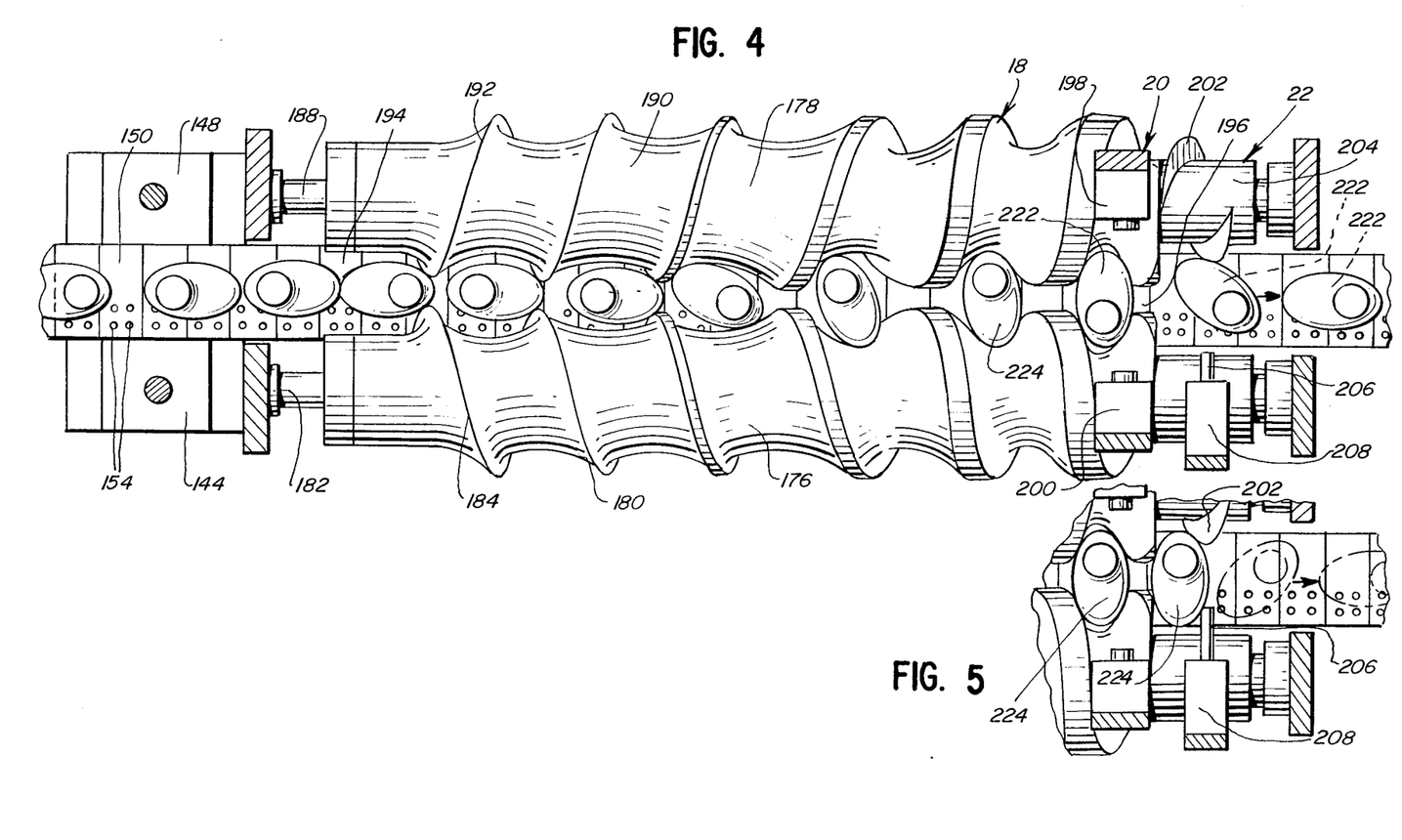
FIG. 4 is a partial cross-sectional view taken on Line 4—4 of FIG. 3 showing containers moving between a pair of screw conveyors.
FIG. 5 is a fragmentary portion of FIG. 4 showing a second turning assembly in operation to rotate a container in a clockwise direction.

First turning assembly 18 is shown in FIG. 4. The first turning assembly includes a pair of screw conveyors 176 and 178. Screw conveyor 176 has a tapered screw surface 180 mounted on a screw shaft 182 which screw shaft is drivingly connected to screw drive 144. As may be seen in FIG. 4, outer screw surface 180 has a tapered right-hand screw thread 184 formed thereon. The screw thread has a decreasing lead from the entry end to the discharge end; however, the depth of the thread increases from the entry end to the discharge end.

Screw conveyor 178 is mounted on a screw shaft 188 which screw shaft is drivingly connected to screw drive 148. Screw conveyor 178 includes an outer surface 190 which has a tapered left-hand thread 192 formed thereon. Surface 190 with thread 192 is a mirror-image of surface 180 and screw thread 184. The screw conveyors are rotated in opposite directions toward each other at the same rate of rotation.

Screw conveyors 176 and 178 are positioned adjacent to each other as shown in FIG. 4, and define an entry 194 to allow containers to enter between the screw threads and to rotate containers between the threads so that the containers are rotated approximately 90° when the containers reach a discharge 196 at the other end of the screw conveyors.

Detector assembly 20 includes a conventional electric eye 198 mounted on discharge end 52 adjacent to the discharge of the screw conveyors. A second conventional electric eye 200 is mounted on discharge end 78 opposite the first mentioned electric eye 198. The electric eye 198 and 200 are focused to detect the presence of a portion of a container at a given distance. Thus, if a portion of an asymmetrical container is positioned closer to electric eye 200, the electric eye 200 will detect the presence of the portion of the container, whereas electric eye 198 will not detect the presence of a portion of a container.

The second turning assembly 22 includes a helical turning blade 202 which is mounted on a hub 204 connected to screw conveyor 178 for rotation with the screw conveyor. The turning blade extends above a portion of the longitudinal conveyor to engage each container discharged by the screw conveyors through discharge 196. The second turning assembly also includes stop fingers 206 which are connected to a conventional solenoid 208. Stop fingers 206, in its retracted mode, are positioned away from the longitudinal conveyor, as may be seen in FIG. 4. When solenoid 208 is activated, stop fingers 206 are extended over a portion of the longitudinal conveyor to engage a container carried on the longitudinal conveyor, as may be best seen in FIG. 5.

The instant apparatus includes conventional entry guide rails 210 positioned adjacent to the entry end of the screw conveyors to aid the containers to remain upright. Exit guide rails 212 extend from the discharge end of the screw conveyors to the end of the longitudinal conveyor.

The instant apparatus is adapted to handle containers of various sizes. The spacing between the screw conveyors may be adjusted by loosening the bolts holding tables 50 and 76. Sprocket 104 is cranked in a selected direction to move the tables 50 and 76 and thereby position the screw conveyors apart or closer together as is required. The drives for the screw conveyors are connected through spline 116 on drive shaft 112, so that the tables may be moved relative to each other moving not only the screw conveyors, but the entire drive mechanism from the drive shaft 112 onward.

The rate of movement of the longitudinal conveyor from one end of the frame to the other and the rate of movement of a container through the screw conveyors can be selectively adjusted by adjusting the gear boxes 138 and 140. In this instance, the rate of movement of the longitudinal conveyor is greater than the rate at which containers are carried through the screw conveyors so that the containers are continually pressed into engagement with the threaded portion of the screw conveyors. The rotation of the screw conveyors toward each other applies a downward force to the containers in engagement with the screw conveyors. In view of the fact that the screw conveyors and the longitudinal conveyors are driven from the same source, namely, electrical motor 108, it is evident that the relative rate of movement between the longitudinal conveyor and the screw conveyors is maintained at a constant selected ratio.

For purposes of illustration, containers 214 are shown and described in connection with the operation of the present invention. It is to be understood that any of a variety of containers may be utilized with the present apparatus. Each of the containers 214 is, in this instance, a blow molded plastic container having a base 216 which supports the container. The base has an outer wall 218 formed integral therewith. The outer wall has a mouth 220 formed in the upper portion thereof. Mouth 220 is offset from the center, as may be best seen in FIGS. 1 and 4. Containers 214 are asymmetrical in a plane which is substantially perpendicular to base 216. The subject apparatus aligns all of the containers 214 so that the relative position of the mouth 220 of each container is in the same relative position of each other container after leaving the second turning assembly.

Containers 214 are loaded onto longitudinal conveyor 14 between entry guides 210. The containers are all aligned when entering the longitudinal conveyor so that the plane of asymmetry of each container is parallel to the direction of movement of the longitudinal conveyor. The position of the mouth of each container is random in that the mouth may be either adjacent to the leading edge or the trailing edge of the plane of asymmetry of each container as generally indicated in FIG. 4.

The base of each of the conveyors rests on one or more platens 150 and air being drawn through apertures 152 causes the base to be held securely onto the platens so that the containers are not likely to tip and fall. The containers are carried by the longitudinal conveyor to entry 194 of the screw conveyors. The longitudinal conveyor moves the containers toward the screw conveyors faster than the screw conveyors allow the containers to move between the screw conveyors so that the containers are constantly urged into engagement with screws 184 and 192. As the containers are pushed into the screws, they are turned by the screws so that the containers are rotated 90° between the screw conveyors. The containers approach discharge 196 traveling on the longitudinal conveyor with the plane of asymmetry substantially perpendicular to the direction of movement of the longitudinal conveyor. Throughout the rotation of the containers between the screw conveyors, the containers are supported by both screw conveyors to stabilize the containers and minimize the likelihood of tipping.

As the containers are carried to discharge 196, the containers pass by detector assembly 20. In the event that a container such as specific container 222, is positioned between the electric eyes 198 and 200, electric eye 200 strikes the mouth of container 220. The container is discharged, and the container then engages helical turning blade 202. The longitudinal conveyor moves the container forward while the edge of the container adjacent to electric eye 198 is retained by the helical turning blade which engages the containers adjacent to the center of gravity of the containers to reduce the likelihood of tipping of the containers. The rate of rotation of the helical turning blade is such that the container is allowed to move forward, but the edge which engages the turning blade does not move as fast as the longitudinal conveyor is moving the container. Thus, the container is rotated in a counterclockwise direction, as shown in FIG. 4 with the containers shown in dotted form in stages of rotation.

In the event that a container, such as container 224, is positioned between the electric eyes 198 and 200, the electric eye 198 then detects that the mouth is closer to electric eye 198. Solenoid 208 is energized to extend fingers 206 to the position shown in FIG. 5. The longitudinal conveyor still tends to move the container at the rate of the longitudinal conveyor; however, fingers 206 are stationary, and the fingers engage one edge of container 224 adjacent to the center of gravity of the conveyor to reduce the likelihood of tipping of the containers. The opposite edge of the container engages helical turning blade 202, which allows that edge to move but at a slower rate than does the longitudinal conveyor. This arrangement results in the container having one edge held stationary by fingers 206 while the opposite edge is allowed to move, but at a slower rate than the rate at which the longitudinal conveyor moves. Thus, the container is rotated in a clockwise direction, as shown in dotted form in FIG. 5.

It is readily apparent that irrespective of whether the container is rotated in a clockwise direction or a counterclockwise direction in the second turning assembly, it is turned at a slow rate until the asymmetrical plane of the container is parallel to the direction of movement of the longitudinal conveyor. The rate of turning it is the difference between the rate of movement of one edge of the containers and the other edge of the same containers. In the case of counterclockwise rotation, the rate of turning is determined by the lead and rate of rotation of the turning blade relative to the rate of longitudinal movement of the longitudinal conveyor. In the case of rotation in a clockwise direction, the rate is determined by the lead of the helical turning blade and the rate of rotation of the helical blade. In either case, once the turning is completed at a slow rate and the containers are aligned with their asymmetrical planes in line with the mouths all in the same relative position, the containers are then carried away at the rate of the longitudinal conveyor. The containers are supported by discharge guides 212. At all times in the critical movements, the containers are rotated at a slow rate and as the containers are rotated, the rate of rotation is controlled by the rate of turning of the helical turning blade. Thus, the likelihood of tipping or other disorientation of the containers is substantially decreased.

Although a specific embodiment of the herein disclosed invention has been shown and described in detail above, it is readily apparent that those skilled in the art may make various modifications and changes in the instant invention without departing from the spirit and scope of this invention. It is to be expressly understood that this invention is limited only by the appended claims.

I claim:

1. An apparatus for orienting substantially identical containers, each container having a base for holding the container substantially upright, each container having a portion of its outer surface asymmetrical in a plane substantially perpendicular to the base, the apparatus comprising; a longitudinal conveyor movably carrying said containers from one end of the conveyor to the other end of the conveyor, a first turning assembly adjacent to a portion of the longitudinal conveyor rotating each of the containers on the conveyor to a position in which each container has its asymmetrical plane substantially parallel to the direction of movement of the conveyor, an attitude detector sensing the position of the asymmetrical plane of each container after completion of rotation by the first turning assembly, and a second turning assembly having a portion controlled by the attitude detector for turning approximately 90° selectively either clockwise or counterclockwise each container to align all of the containers wherein the plane of asymmetry of each container is substantially parallel to the plane of asymmetry of each of the turned containers and the plane of asymmetry of each container is in the same attitude as the plane of asymmetry of each other container discharged from the second turning assembly.

2. An apparatus for orienting substantially identical containers as defined in claim 1, wherein said first turning assembly includes a screw conveyor aligned with a portion of the longitudinal conveyor, said screw conveyor engageable with the containers to rotate the containers while the containers are supported on the longitudinal conveyor.

3. An apparatus for orienting substantially identical containers as defined in claim 1, wherein the first turning assembly includes a pair of screw conveyors positioned adjacent to each other and above a portion of the longitudinal conveyor, said screw conveyors being rotated in opposite directions, said screw conveyors being tapered from an entry end of the screw conveyors to a discharge end of the screw conveyors to rotate containers between the screw conveyors relative to the first mentioned conveyor.

4. An apparatus for orienting substantially identical containers as defined in claim 1, wherein said second turning assembly includes a turning blade being formed in a helix and rotating adjacent to the conveyor to engage each container discharged from the first turning assembly to hold one edge of each of said containers over the length of the turning blade while the container is being carried by the longitudinal conveyor.

5. An apparatus for orienting substantially identical containers as defined in claim 1, wherein said second turning assembly includes a stop being selectively positioned adjacent to the longitudinal conveyor for selectively engaging containers discharged from the first turning assembly for selectively holding one edge of a selected container as the container is carried by the conveyor to rotate the container relative to the conveyor to position the container with its asymmetrical plane in substantial alignment with the direction of movement of the conveyor.

6. An apparatus for orienting substantially identical containers as defined in claim 1, including a drive connected to the conveyor and to the first turning assembly to restrain movement of the containers so that the container carried by the longitudinal conveyor moves at a faster rate than in the first turning assembly to hold the containers in contact with the first turning assembly.

7. An apparatus for orienting substantially identical containers as defined in claim 1, wherein said conveyor includes a plurality of interconnected platens, each of said platens containing an aperture, an air evacuating apparatus connected to a portion of the conveyor for drawing air through the apertures in the platens to create a negative pressure over the platens for holding the base of each of the containers in firm contact with the conveyor.

8. An apparatus for orienting substantially identical containers as defined in claim 1, wherein said first turning assembly includes a screw conveyor aligned with a portion of the longitudinal conveyor, said screw conveyor engageable with the containers to rotate the containers while the containers are supported on the longitudinal conveyor, and means connected to the screw conveyor to position the screw conveyor a selected distance from the longitudinal conveyor.

9. An apparatus for orienting substantially identical containers as defined in claim 1, wherein said first turning assembly includes a screw conveyor engageable with the containers to rotate the containers 90° while the containers are supported on the longitudinal conveyor, and said second turning assembly includes a turning blade being formed in a helix and rotating adjacent to the longitudinal conveyor to engage containers discharged from the first turning assembly to restrain one edge of each container over the length of the turning blade.

10. An apparatus for orienting substantially identical containers as defined in claim 1, wherein said first turning assembly includes a screw conveyor aligned with a portion of the longitudinal conveyor, said screw conveyor engageable with the containers to rotate the containers while the containers are supported on the longitudinal conveyor, and said second turning assembly includes a stop selectively positioned adjacent to the longitudinal conveyor for selectively engaging containers discharged from the first turning assembly for holding one edge of the selected container to rotate the container relative to the longitudinal conveyor to position the container with its asymmetrical plane in substantial alignment with the direction of movement of the longitudinal conveyor.

11. An apparatus for orienting substantially identical containers as defined in claim 1, wherein the first turning assembly includes a pair of screw conveyors positioned adjacent to each other and above a portion of the longitudinal conveyor, said screw conveyors being rotated in opposite directions, said screw conveyors having an entry end and a discharge end, said screw conveyors rotating the containers relative to the longitudinal conveyor to position the container at the discharge end in an attitude wherein the asymmetrical plane is substantially perpendicular to the direction of movement of the longitudinal conveyor, and means for selectively adjusting the distance between the screw conveyors.

12. An apparatus for orienting substantially identical containers as defined in claim 1, wherein said first turning assembly includes a screw conveyor engageable with the containers to rotate the containers while the containers are supported on the longitudinal conveyor, and a drive connected to the longitudinal conveyor and the screw conveyor to rotate the screw conveyor at a rate to restrain the container so that a container moving on the longitudinal conveyor moves at a faster rate than in the screw conveyor to hold the container in contact with the screw conveyor.

13. An apparatus for orienting substantially identical containers as defined in claim 1, wherein the longitudinal conveyor is made up of a plurality of interconnected platens, each of said platens having an aperture, an air evacuating apparatus connected to a portion of the conveyor for drawing air through the platens to create a negative pressure over the platens to hold the containers on the conveyor, and said first turning assembly including a screw conveyor engageable with the containers to rotate the containers while the containers are supported on the longitudinal conveyor.

14. An apparatus for orienting substantially identical containers as defined in claim 1, wherein the first turning assembly includes a pair of screw conveyors positioned adjacent to each other above the longitudinal conveyor, said screw conveyors rotating in opposite directions, said screw conveyors being tapered from an entry end of the conveyors to a discharge end of the conveyor to rotate containers between the screw conveyors relative to the longitudinal conveyor, and said second turning assembly including a turning blade being formed in a helix, said turning blade being connected to one of the screw conveyors and rotating adjacent to the end of the screw conveyor opposite the entry end of the screw conveyors to engage containers discharged from the screw conveyors to restrain one edge of each container over the length of the turning blade.

15. An apparatus for orienting substantially identical containers as defined in claim 1, wherein the first turning assembly includes a pair of screw conveyors positioned adjacent to each other and aligned with a portion of the longitudinal conveyor, said screw conveyors being positioned above a portion of the longitudinal conveyor, said screw conveyors rotating in opposite directions, said screw conveyors being tapered from an entry end of the screw conveyors to a discharge end of the screw conveyors to rotate containers between the screw conveyor relative to the longitudinal conveyor, and said second turning assembly including a stop being selectively positioned adjacent to the longitudinal conveyor for selectively engaging containers discharged from the screw conveyors for holding one edge of the containers as the opposite edge of the containers is carried by the longitudinal conveyor to rotate the container relative to the longitudinal conveyor to position the container with its asymmetrical plane in substantial alignment with the direction of movement of the longitudinal conveyor.

16. An apparatus for orienting substantially identical containers as defined in claim 1, wherein the first turning assembly includes a pair of screw conveyors positioned adjacent to each other above the longitudinal conveyor, said screw containers rotating in opposite directions, said screw conveyors being tapered from an entry end of the conveyor to a discharge end of the conveyor to rotate containers between the screw conveyors relative to the longitudinal conveyor, and a drive connected to the longitudinal conveyor and the screw conveyors to rotate the screw conveyors at a rate to restrain the containers between the screw conveyors so that the containers carried by the longitudinal conveyor move at a faster rate than between the screw conveyors to hold the containers in contact with the screw conveyors to facilitate rotation of the containers.

17. An apparatus for orienting substantially identical containers as defined in claim 1, wherein said longitudinal conveyor is made up of a plurality of interconnected platens, each of said platens containing an aperture, an air evacuating apparatus connected to a portion of the conveyor for drawing air through the platens to create a negative pressure over the platens for holding the base of each of the containers on the longitudinal conveyor, and the first turning assembly includes a pair of mirror-image screw conveyors positioned adjacent to each other and being aligned with a portion of the longitudinal conveyor, said screw conveyors being positioned above the longitudinal conveyor and adjacent to a portion of the air evacuating apparatus, and said screw conveyors being tapered from an entry end of the screw conveyors to a discharge end of the screw conveyors to rotate containers between the screw conveyors relative to the longitudinal conveyor.

18. An apparatus for orienting substantially identical containers as defined in claim 1, wherein the first turning assembly includes a pair of screw conveyors positioned adjacent to each other and above a portion of the longitudinal conveyor, said screw conveyors being rotated in opposite directions, said screw conveyors being tapered from an entry end of the screw conveyors to a discharge end of the screw conveyors to rotate containers between the screw conveyors relative to the longitudinal conveyor, said longitudinal conveyor including a plurality of interconnected platens, each of the platens containing an aperture, and an air evacuating apparatus connected to a portion of the longitudinal conveyor for drawing air through the apertures in the platens to create a negative pressure over the platens for holding the base of each of the containers in firm contact with the longitudinal conveyor.

19. An apparatus for orienting substantially identical containers as defined in claim 1, wherein said second turning assembly includes a turning blade being formed in a helix and rotating adjacent to the longitudinal conveyor to engage each container discharged from the first turning assembly to restrain one edge of each of said containers over the length of the turning blade while the container is being carried by the longitudinal conveyor, and said second turning assembly includes a stop being selectively positioned adjacent to the longitudinal conveyor for selectively engaging containers being discharged from the first turning assembly for selectively holding one edge of a selected container as the container is carried by the longitudinal conveyor and the other edge of the container is in engagement with the turning blade to rotate the container relative to the longitudinal conveyor to position the container with its asymmetrical plane in substantial alignment with the direction of movement of the longitudinal conveyor.

20. An apparatus for orienting substantially identical containers as defined in claim 1, wherein said second turning assembly includes a turning blade being formed in a helix and rotating adjacent to the longitudinal conveyor to engage each container discharged from the first turning assembly to restrain one edge of each of said containers over the length of the turning blade while the container is being carried by a longitudinal conveyor, a drive is connected to the longitudinal conveyor and the first turning assembly to restrain movement of the containers so that the containers carried by the longitudinal conveyor move at a faster rate than in the first turning assembly to hold the containers in contact with the first turning assembly, and said drive determining the rate of rotation of the turning blade to move the containers on the longitudinal conveyor at a greater rate than the rate of movement allowed by the turning blade.

21. An apparatus for orienting substantially identical containers as defined in claim 1, wherein said longitudinal conveyor is made up of a plurality of interconnected platens, each of said platens having an aperture, an air evacuation apparatus connected to a portion of the longitudinal conveyor for drawing air through the apertures in the platens to create a negative pressure over the platens for holding the base of each of the containers in firm contact with the platens of the longitudinal conveyor, and said second turning assembly including a turning blade being formed in a helix and rotating adjacent to the longitudinal conveyor to engage each container discharged from the first turning assembly to restrain one edge of each of said containers over the length of the turning blade while the container is being carried by the longitudinal conveyor.

22. An apparatus for orienting substantially identical containers as defined in claim 1, wherein said longitudinal conveyor includes a plurality of interconnected platens, each of said platens containing an aperture, an air evacuation apparatus connected to a portion of the longitudinal conveyor for drawing air through the apertures in the platens to create a negative pressure over the platens for holding the base of each of the containers in firm contact with the conveyor, said first turning assembly including a pair of screw conveyors positioned adjacent to each other and above a portion of the longitudinal conveyor, said screw conveyors being rotated in opposite directions, said screw conveyors being tapered from an entry end of the screw conveyors to a discharge end of the screw conveyors to rotate approximately 90° containers between the screw conveyors relative to the longitudinal conveyor, said second turning assembly including a turning blade being formed in a helix and rotating adjacent to one of the screw conveyors and rotating at the same rate as the screw conveyor, said turning blade engaging each container discharged from the first turning assembly to restrain one edge of each of said containers over the length of the turning blade while the container is being carried by the longitudinal conveyor, said second turning assembly including a stop being selectively positioned adjacent to the longitudinal conveyor for selectively engaging containers being discharged from the first turning assembly for selectively holding one edge of a selected container as the container is carried by the longitudinal conveyor and the other edge engages the turning blade to rotate the container relative to the longitudinal conveyor to position the container with its asymmetrical plane in substantial alignment with the direction of movement of the conveyor, and a drive is connected to the longitudinal conveyor and the screw conveyors of the first turning assembly to restrain movement of the containers between the screw conveyors so that the containers carried by the longitudinal conveyor move at a faster rate than allowed by the screw conveyors to hold the containers in contact with the screw conveyors.

23. An apparatus for orienting substantially identical containers as defined in claim 1, wherein said longitudinal conveyor includes a plurality of connected platens, each of said platens having an aperture extending therethrough, an air evacuation apparatus connected to a portion of the longitudinal conveyor for drawing air through the apertures in the platens to create a negative pressure over the platens for holding the base of each of the containers in firm contact with the platens of the conveyor, said first turning assembly including a pair of screw conveyors positioned adjacent to each other and above a portion of the longitudinal conveyor, each of said screw conveyors being movably supported on the frame, said screw conveyors being rotated in opposite directions toward each other to apply a downward force to a container between the screw conveyor, said screw conveyors being tapered from an entry end of the screw conveyors to a discharge end of the screw conveyors to rotate approximately 90° containers between the screw conveyors relative to the longitudinal conveyor, and means for adjusting the distance between the screw conveyors; said second turning assembly including a turning blade being formed in a helix and rotating adjacent to one of the screw conveyors and rotating at the same rate as that screw conveyor, said turning blade engaging each container discharged from the first turning assembly to restrain one edge of each of said containers over the length of the turning blade while the container is being carried by the longitudinal conveyor, said second turning assembly including a stop being selectively positioned adjacent to the longitudinal conveyor opposite the turning blade for selectively engaging containers being discharged from the first turning assembly for selectively holding one edge of a selected container as the container is carried by the longitudinal conveyor and the other edge engages the turning blade to rotate the container relative to the longitudinal conveyor to position the container with its asymmetrical plane in substantial alignment with the direction of movement of the longitudinal conveyor; and a drive is connected to the longitudinal conveyor and the screw conveyors of the first turning assembly to restrain movement of the container between the screw conveyors so that the containers carried by the longitudinal conveyor move at a faster rate than allowed by the screw conveyors to hold the containers in contact with the screw conveyors.

* * * * *